US012380213B2

(12) United States Patent
Eguchi et al.

(10) Patent No.: US 12,380,213 B2
(45) Date of Patent: Aug. 5, 2025

(54) DETECTING ALTERATION OF BOOT CODE

(71) Applicant: CANON KABUSHIKI KAISHA, Tokyo (JP)

(72) Inventors: Takami Eguchi, Tokyo (JP); Nobuhiro Tagashira, Chiba (JP); Ayuta Kawazu, Kanagawa (JP); Yuki Minetomo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 328 days.

(21) Appl. No.: 17/685,211

(22) Filed: Mar. 2, 2022

(65) Prior Publication Data

US 2022/0284103 A1   Sep. 8, 2022

(30) Foreign Application Priority Data

Mar. 5, 2021   (JP) .................................. 2021-035241

(51) Int. Cl.
*G06F 21/57*   (2013.01)
*G06F 21/55*   (2013.01)

(52) U.S. Cl.
CPC .......... *G06F 21/572* (2013.01); *G06F 21/554* (2013.01); *G06F 2221/033* (2013.01)

(58) Field of Classification Search
CPC . G06F 21/572; G06F 21/554; G06F 2221/033
See application file for complete search history.

(56) References Cited

U.S. PATENT DOCUMENTS

| 6,715,074 | B1 * | 3/2004 | Chaiken | G06F 8/60 713/168 |
| 7,318,151 | B1 * | 1/2008 | Harris | G06F 21/572 713/100 |
| 8,386,763 | B1 * | 2/2013 | Spangler | G06F 21/575 713/1 |
| 9,058,491 | B1 * | 6/2015 | Ahlquist | G06F 9/4401 |
| 9,880,908 | B2 | 1/2018 | Jeansonne et al. | |
| 2003/0126442 | A1 * | 7/2003 | Glew | G06F 21/52 713/170 |
| 2003/0126453 | A1 * | 7/2003 | Glew | G06F 21/57 711/E12.075 |
| 2003/0126454 | A1 * | 7/2003 | Glew | G06F 21/51 711/135 |

(Continued)

FOREIGN PATENT DOCUMENTS

| JP | 2006039888 A | * | 2/2006 | ........... G06F 21/575 |
| JP | 2020140561 A | | 9/2020 | |

OTHER PUBLICATIONS

NPL History Search (Year: 2024).*
NPL Search History (Year: 2024).*

*Primary Examiner* — John B King
(74) *Attorney, Agent, or Firm* — Canon U.S.A., Inc. IP Division

(57) ABSTRACT

An information processing apparatus includes a first storage medium configured to store a first boot code, a boot code signature value for the entire first boot code, and a specific area signature value for a specific area in the first storage medium, and an alteration detection unit configured to perform detection of an alteration of the first boot code by using the boot code signature value stored in the first storage medium, and perform detection of an alteration in the specific area by using the specific area signature value stored in the first storage medium.

12 Claims, 10 Drawing Sheets

(56) References Cited

U.S. PATENT DOCUMENTS

| | | | | |
|---|---|---|---|---|
| 2004/0083379 | A1* | 4/2004 | Neuman | G06F 21/575 713/193 |
| 2005/0026698 | A1* | 2/2005 | Pirich | A63F 13/10 463/43 |
| 2005/0044404 | A1* | 2/2005 | Bhansali | H04W 12/082 726/26 |
| 2005/0273588 | A1* | 12/2005 | Ong | G06F 11/1417 713/2 |
| 2006/0107009 | A1* | 5/2006 | Ooshima | G06F 3/0679 711/163 |
| 2006/0288180 | A1* | 12/2006 | Shih | G06F 21/79 711/163 |
| 2007/0288740 | A1* | 12/2007 | Dale | G06F 9/4405 713/2 |
| 2008/0045342 | A1* | 2/2008 | Crowder | G06F 9/4403 717/176 |
| 2008/0046781 | A1* | 2/2008 | Childs | G06F 21/575 714/15 |
| 2008/0086629 | A1* | 4/2008 | Dellow | G06F 9/4401 713/2 |
| 2008/0141017 | A1* | 6/2008 | McCoull | G07F 17/32 726/16 |
| 2009/0172639 | A1* | 7/2009 | Natu | G06F 21/57 717/120 |
| 2009/0327684 | A1* | 12/2009 | Zimmer | G06F 21/575 713/2 |
| 2010/0062844 | A1* | 3/2010 | Crowder, Jr. | G06F 21/575 463/29 |
| 2010/0120529 | A1* | 5/2010 | Shimabukuro | G06F 21/575 463/43 |
| 2011/0087872 | A1* | 4/2011 | Shah | G06F 21/74 713/2 |
| 2012/0066446 | A1* | 3/2012 | Sabjan | G06F 11/2038 718/1 |
| 2012/0124356 | A1* | 5/2012 | Datta | G06F 11/0793 713/2 |
| 2012/0167205 | A1* | 6/2012 | Ghetie | G06F 21/572 726/22 |
| 2013/0013905 | A1* | 1/2013 | Held | G06F 21/572 713/2 |
| 2013/0262612 | A1* | 10/2013 | Langas | G06F 13/364 709/212 |
| 2014/0040605 | A1* | 2/2014 | Futral | G06F 9/445 713/2 |
| 2014/0089667 | A1* | 3/2014 | Arthur, Jr. | H04L 9/3236 713/171 |
| 2016/0055068 | A1* | 2/2016 | Jeansonne | G06F 21/572 714/15 |
| 2017/0249483 | A1* | 8/2017 | Kawazu | G06F 21/64 |
| 2019/0050573 | A1* | 2/2019 | Connor | G06F 21/572 |
| 2019/0088350 | A1* | 3/2019 | Matsumoto | G11C 29/52 |
| 2019/0114429 | A1* | 4/2019 | Shimizu | G06F 21/572 |
| 2019/0340365 | A1* | 11/2019 | Nijhawan | G06F 21/44 |
| 2020/0074075 | A1* | 3/2020 | Yasukawa | G06F 21/51 |
| 2020/0320200 | A1* | 10/2020 | Singh | G06F 8/65 |
| 2021/0011734 | A1* | 1/2021 | Dang | H04L 9/088 |
| 2021/0264032 | A1* | 8/2021 | Sayyed | G06F 9/441 |
| 2023/0198775 | A1* | 6/2023 | Liu | G06F 21/572 |

* cited by examiner

FIG.4

| OFFSET | INFORMATION NAME |
|---|---|
| 0 – 7 | VERSION INFORMATION |
| 8 – 9 | NUMBER OF VERIFICATION TARGETS |
| 10 – 15 | RESERVED AREA |
| 16 – 19 | VERIFICATION RANGE START ADDRESS 1 |
| 20 – 23 | VERIFICATION RANGE SIZE 1 |
| ⋮ | ⋮ |

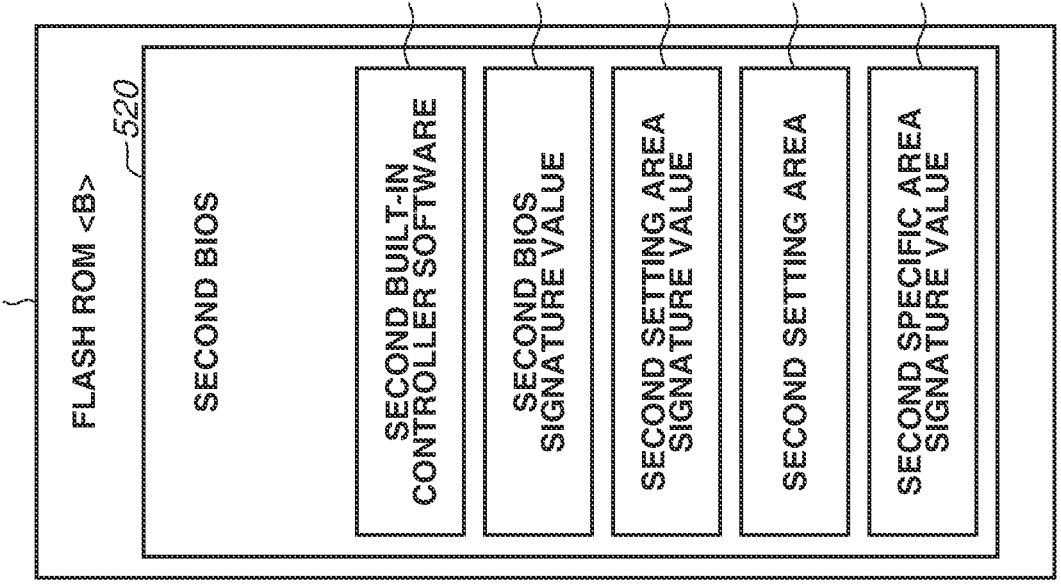
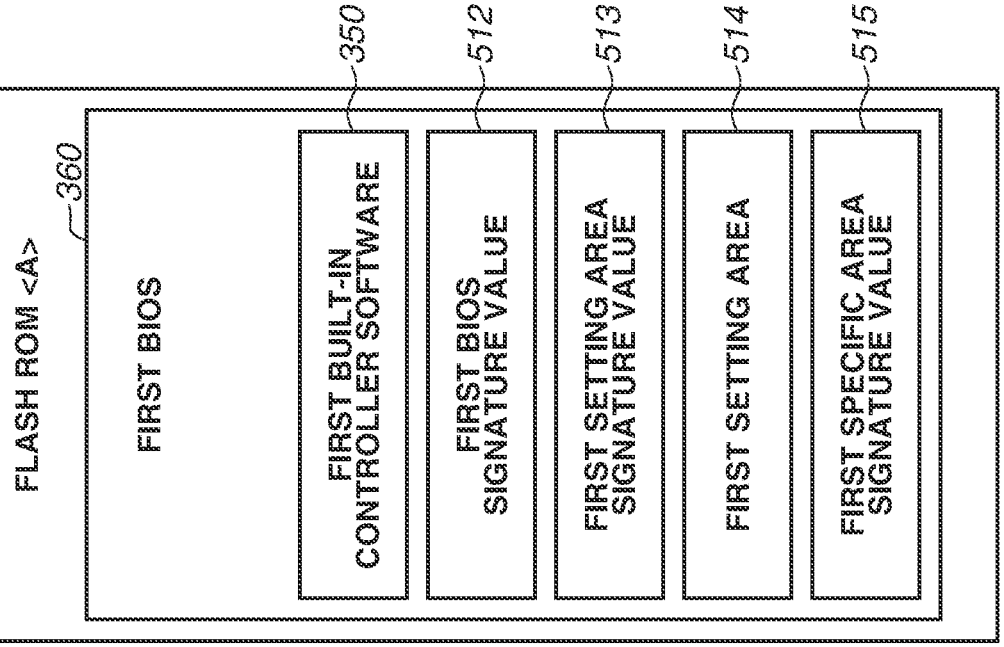
FIG.5

FIG.7

| SETTING AREA OF FIRST BIOS | SETTING AREA OF SECOND BIOS | FIRST BIOS | OPERATION |
|---|---|---|---|
| OK | OK | OK | UPDATE SECOND BIOS WHEN VERSION INFORMATION IS DIFFERENT (S613) |
| OK | FAILURE | OK | UPDATE SECOND BIOS (S613) |
| OK | OK | FAILURE | RECOVERY (S611) |
| OK | FAILURE | FAILURE | ACTIVATION FAILURE (S618) |
| FAILURE | OK | — | RECOVERY (S611) |
| FAILURE | FAILURE | — | ACTIVATION FAILURE (S618) |

DETECTING ALTERATION OF BOOT CODE

BACKGROUND

Field of the Disclosure

The present disclosure relates to an information processing apparatus that detects an alteration of software, information processing method, and a storage medium.

Description of the Related Art

There has been a tamper issue that a third party alters software for controlling an information processing apparatus in an unauthorized manner to steal information assets in the information processing apparatus. There has been another tamper issue that an information processing apparatus with altered software is used as a steppingstone. A nonvolatile memory that stores a Basic Input Output System (BIOS) serving as software to be initially activated has layout information which is information about arrangements of a code section and a data section of the BIOS and arrangements of a code section and a data section on the nonvolatile memory. Alterations may be made to the code section and/or the layout information. To prevent such tampers, there has been devised a method for verifying that software in an information processing apparatus has not been altered by a third party. Further, there has been devised a method for recovering software for which an alteration has been detected. In particular, recovery means is limited because the BIOS and Unified Extensible Firmware Interface (UEFI), which are to be initially activated in the apparatus, cannot use network functions and other basic functions in the early stage of the activation. Here, the BIOS is software related to the activation of the apparatus and therefore may be referred to as a boot code.

U.S. Patent Application Publication No. 2016-0055068 discusses a technique in which a built-in controller verifies an activation boot code stored in a first memory, and, when the built-in controller determines that software is altered, overwrites the altered boot code with a recovery boot code prestored in a second memory to recover the boot code. This recovery processing restores the apparatus to a state where the activation boot code stored in the first memory is not altered, thus enabling normal activation of the apparatus. The first memory can also be accessed from a Central Processing Unit (CPU), and the second memory can be accessed only by the built-in controller to prevent unauthorized update of the recovery boot code. Moreover, in U.S. Patent Application Publication No. 2016-0055068, policy-based control is performed so that the boot code in the first memory coincides with the boot code in the second memory.

However, the technique discussed in U.S. Patent Application Publication No. 2016-0055068 cannot identify the altered area such as the layout information in the nonvolatile memory since the signature value of the entire boot code is verified.

SUMMARY

Embodiments of the present disclosure are directed to identifying, at detection of an alteration in a specific area in a storage medium, the altered area. According to embodiments of the present disclosure, an information processing apparatus includes a first storage medium configured to store a first boot code, a boot code signature value for the entire first boot code, and a specific area signature value for a specific area in the first storage medium, and an alteration detection unit configured to perform detection of an alteration of the first boot code by using the boot code signature value stored in the first storage medium, and perform detection of an alteration in the specific area by using the specific area signature value stored in the first storage medium.

Further features of the present disclosure will become apparent from the following description of exemplary embodiments with reference to the attached drawings.

BRIEF DESCRIPTION OF THE DRAWINGS

FIG. 4 illustrates an example format of a setting area.

FIG. 5 illustrates examples of data disposed in a Flash Read Only Memory (ROM) <A> and a Flash ROM <B>.

FIG. 7 illustrates a relation between each verification result and subsequent processing.

DESCRIPTION OF THE EMBODIMENTS

Exemplary embodiments of the present disclosure will be described below with reference to the accompanying drawings. In the present exemplary embodiment, a description will be provided of a verification of a boot code, an update of a recovery boot code, and recovery processing to be performed when the verification for the boot code fails, which are performed by an information processing apparatus. In the following descriptions, a Multi-Function Peripheral (MFP) which is an image forming apparatus is exemplified as an example of an information processing apparatus. The technique according to embodiments of the present disclosure is also applicable to information processing apparatuses other than MFPs. The boot code (BIOS) will be described below as an example of software, the software is also applicable to the verification for the firmware of a Network Interface Card (NIC).

Apparatus Configuration

Figure 1:
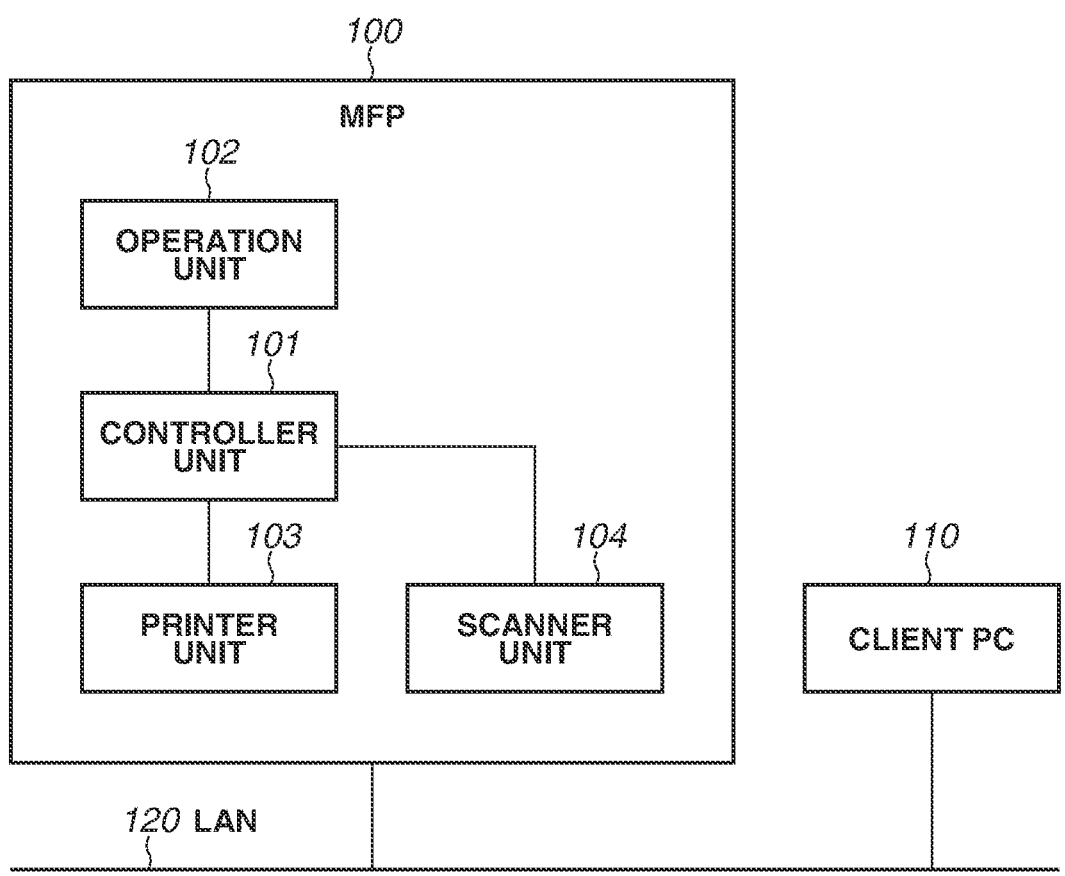
FIG. 1 illustrates a connection form between a Multi-Function Peripheral (MFP) and a client personal computer (PC).

FIG. 1 illustrates a connection form between an MFP serving as an information processing apparatus and a client personal computer (PC). An MFP 100 and a client PC 110 are connected to each other via a Local Area Network (LAN) 120. The MFP 100 includes an operation unit 102 that outputs information to and inputs information from the user, a printer unit 103 that outputs electronic data to a paper medium, and a scanner unit 104 that reads a paper medium and converts the read data into electronic data. The operation unit 102, the printer unit 103, and the scanner unit 104 are connected to the controller unit 101 to implement the functions of an MFP under the control of the controller unit 101. The client PC 110 performs processing for transmitting a print job to the MFP 100.

Figure 2:
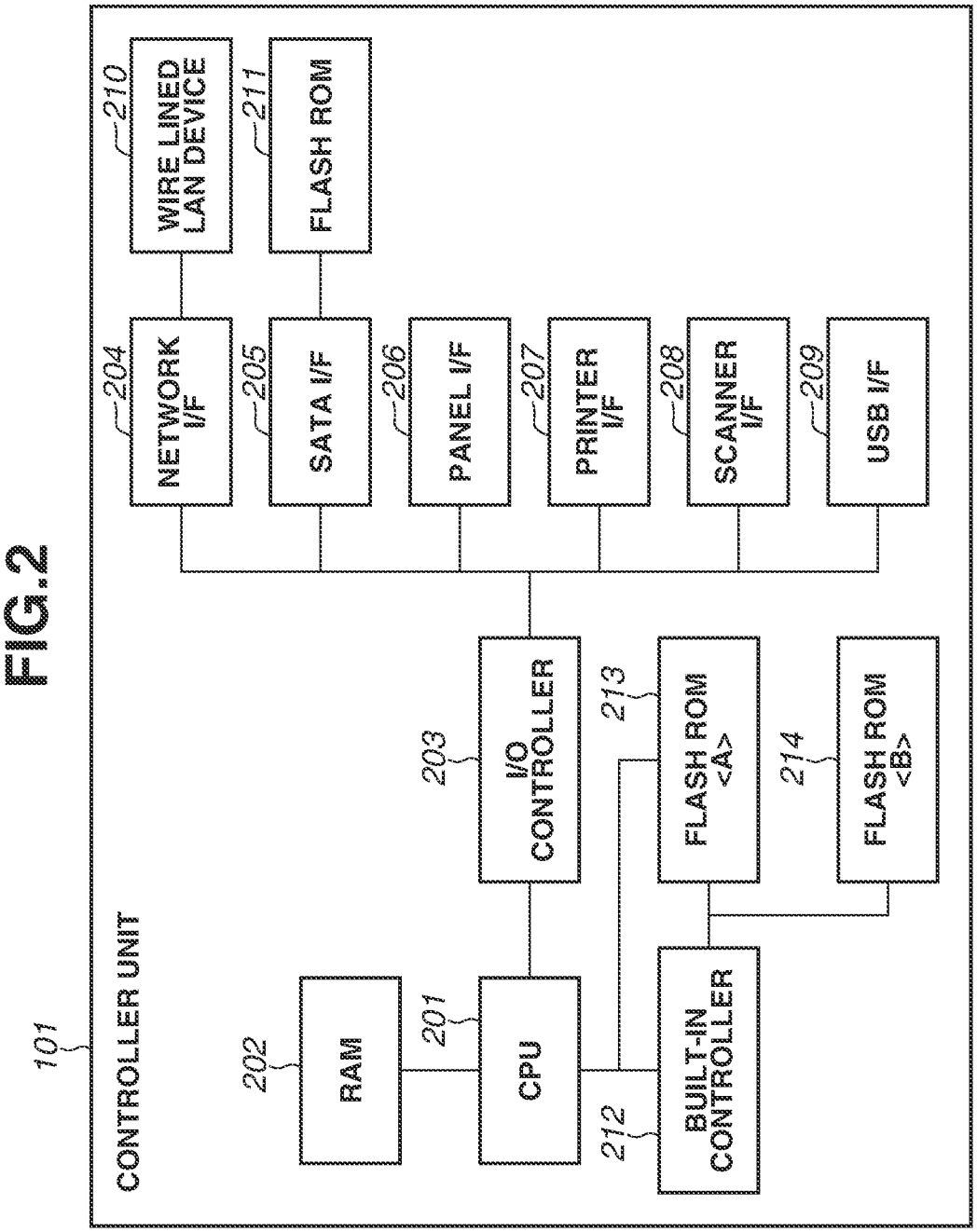
FIG. 2 illustrates an example of a configuration of a controller unit of the MFP.

FIG. 2 is a block diagram illustrating an example of an internal configuration of the controller unit 101 of the MFP 100. A Central Processing Unit (CPU) 201 executes main calculation processing in the controller unit 101. The CPU 201 is an example of a second control unit. The CPU 201 is connected to a Random Access Memory (RAM) 202 via a bus. The RAM 202 is used as a work memory by the CPU 201 to store program data representing calculation instructions in the calculation process and arrange processing target data. The CPU 201 is connected to an input/output (I/O) controller 203 via a bus. The I/O controller 203 performs input and output operations for various devices according to instructions of the CPU 201. The I/O controller 203 is connected to a Serial Advanced Technology Attachment (SATA) interface (I/F) 205 which is connected to a Flash Read Only Memory (ROM) 211. The CPU 201 uses the Flash ROM 211 to store programs for implementing the MFP functions and document files.

The I/O controller 203 is connected to a network I/F 204 which is connected to a wire lined LAN device 210. The CPU 201 controls the wire lined LAN apparatus 210 via the network I/F 204 to implement the communication on the LAN 120. The I/O controller 203 is connected to a panel I/F 206. The CPU 201 implements user input and output operations performed on the operation unit 102 via the panel I/F 206. The I/O controller 203 is connected to a printer I/F 207. The CPU 201 implements processing for outputting a paper medium by using the printer unit 103 via the printer I/F 207. The I/O controller 203 is connected to a scanner I/F 208. The CPU 201 implements document read processing using the scanner unit 104 via the scanner I/F 208. The I/O controller 203 is connected to a Universal Serial Bus (USB) I/F 209 to control any devices connected to the USB I/F 209.

A Flash ROM <A> 213 is connected to the CPU 201 and a built-in controller 212 via a bus, and stores a control program that implements a first BIOS 360 (described below). A Flash ROM <B> 214 is connected to the built-in controller 212 via a bus, and stores a second BIOS 520 serving as recovery binary data corresponding to the first BIOS 360. The second BIOS 520 is binary data used to recover the first BIOS 360, which is referred to as, for example, BIOS Golden Copy (BIOS GC). The Flash ROM <A> 213 and the Flash ROM <B> 214 are, for example, Serial Peripheral Interface (SPI)-Flash ROMs, which are of a type of a flash memory. In the present exemplary embodiment, the Flash ROM <A> 213 serving as a first storage medium and the Flash ROM <B> 214 serving as a second storage medium are exemplified. However, storage media do not necessarily need to be Flash ROMs and may be non-volatile storage media having a similar function.

The built-in controller 212 is the hardware chip that is activated first after power of the MFP 100 is turned ON. The built-in controller 212 is connected to the Flash ROM <A> 213, the Flash ROM <B> 214, and the CPU 201 via a bus. The built-in controller 212 is a micro-controller that operates independently of the CPU 201 and separately includes a CPU, a ROM and a RAM. Thus, the built-in controller 212 is able to perform calculation processing by itself. The built-in controller 212 is an example of a first control unit. For example, the built-in controller 212 performs processing for detecting an alteration in the first BIOS 360, processing for recovering the first BIOS 360 by using the second BIOS 520, and processing for updating the second BIOS 520. After completion of the processing for detecting an alteration in the first BIOS 360 and the processing for updating the second BIOS 520, the built-in controller 212 transmits the reset signal to the CPU 201 to activate the CPU 201, then transfers control to the CPU 201. After transferring control to the CPU 201, the built-in controller 212 enters the sleep mode.

In a case where the CPU 201 performs the copy function, the CPU 201 loads program data (module data) from the Flash ROM 211 into the RAM 202 via the SATA I/F 205. According to the program (module) loaded in the RAM 202, the CPU 201 detects a copy instruction input from the user to the operation unit 102 via the panel I/F 206. Upon detection of the copy instruction, the CPU 201 receives a document as electronic data from the scanner unit 104 via the scanner I/F 208 and then stores the data in the RAM 202. The CPU 201 subjects the image data stored in the RAM 202 to color conversion and other processing suitable for output. The CPU 201 transfers the image data stored in the RAM 202 to the printer unit 103 via the printer I/F 207 to perform processing for outputting the image data to a paper medium.

In a case where Page Description Language (PDL) printing is performed, the client PC 110 issues a print instruction via the LAN 120. The CPU 201 loads program data (module data) from the Flash ROM 211 into the RAM 202 via the SATA I/F 205. The CPU 201 detects the print instruction via the network I/F 204 according to the program (module) loaded in the RAM 202. Upon detection of a PDL transmission instruction, the CPU 201 receives print data via the network I/F 204 and then stores the print data in the Flash ROM 211 via the SATA I/F 205. Upon completion of the print data storage, the CPU 201 loads the print data stored in the Flash ROM 211 into the RAM 202 as image data.

The CPU 201 subjects the image data stored in the RAM 202 to color conversion and other processing suitable for output. The CPU 201 transfers the image data stored in the RAM 202 to the printer unit 103 via the printer I/F 207 to perform processing for outputting the image data to a paper medium.

A description will be provided of the function configuration of the information processing apparatus according to the present exemplary embodiment, processing for detecting a software alteration, processing for recovering the altered software, and processing for updating the recovery software according to the present exemplary embodiment.

Function Configuration

Figure 3:
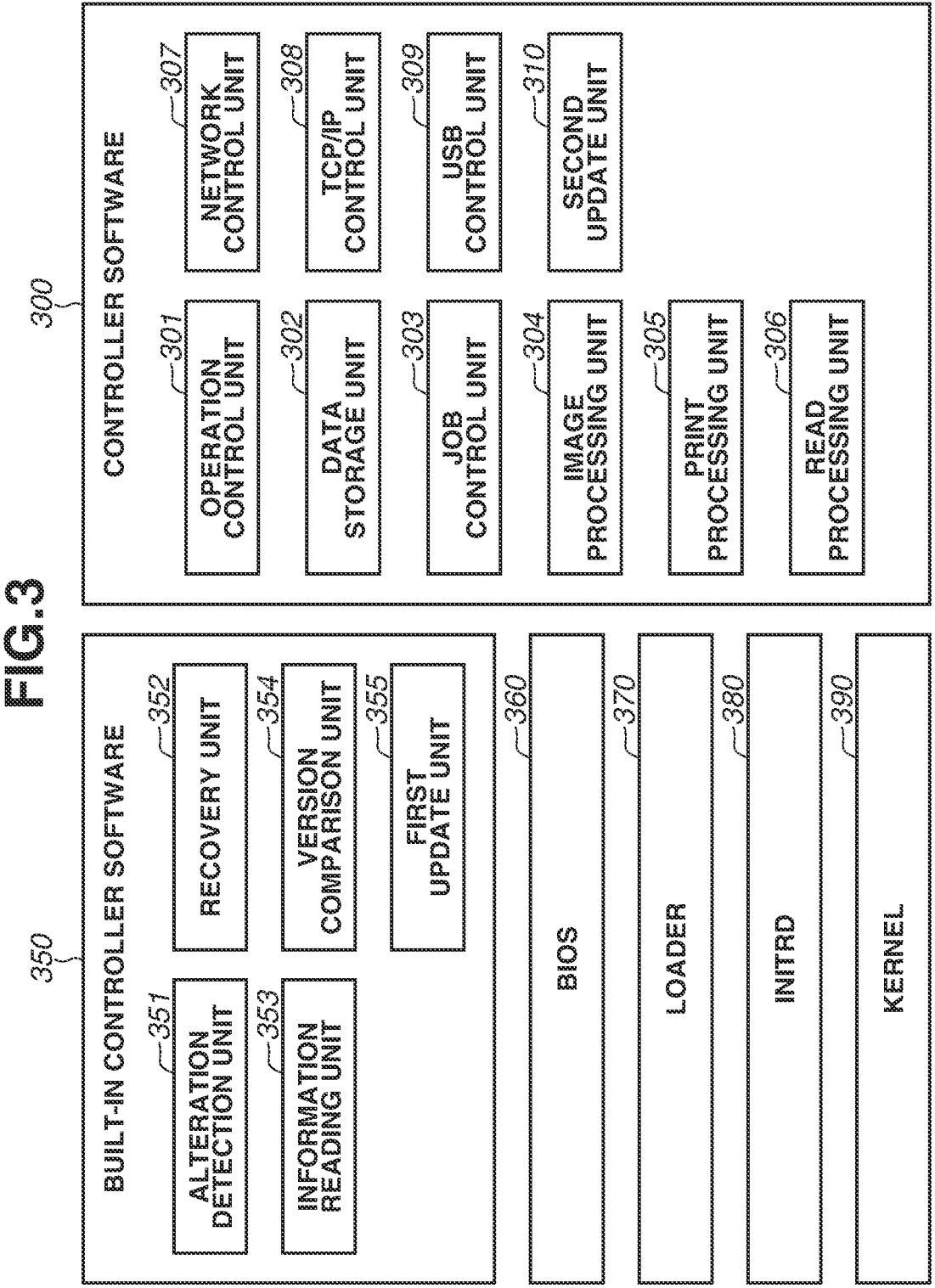
FIG. 3 illustrates an example of a function configuration of the controller unit of the MFP.

FIG. 3 illustrates an example of a function configuration to be implemented by software that is executed by the controller unit 101 of the MFP 100. Of pieces of software executed by the controller unit 101, only built-in controller software 350 is executed by the built-in controller 212, and all of the other pieces of software are executed by the CPU 201.

The built-in controller 212 executes the built-in controller software 350. The built-in controller software 350 may be stored in any location where the software can be read and executed by the built-in controller 212. For example, the built-in controller software 350 may be stored in the ROM included in the built-in controller 212, or stored in the Flash ROM <A> 213 or the Flash ROM <B> 214.

Initially, functions of the built-in controller software 350 will be described below.

An alteration detection unit 351 verifies the first BIOS 360 by using a first BIOS signature value 512 (described below) stored in the Flash ROM <A> 213, to detect whether an alteration exists. Examples of applicable signature verification methods include a signature verification algorithm using the Rivest-Shamir-Adleman (RSA) public key encryption method, which is a known technique, and an Elliptic Curve Digital Signature Algorithm (ECDSA) using the elliptic curve public key encryption method. The public key to be used for the signature verification may be stored in the ROM included in the built-in controller 212 or in the Flash ROM <A> 213 or the Flash ROM <B> 214. The alteration detection unit 351 verifies the second BIOS 520 by using a second BIOS signature value 522 (described below) stored in the Flash ROM <B> 214, to detect whether an alteration exists.

The alteration detection unit 351 verifies a first setting area 514 by using a first setting area signature value 513 (described below) stored in the Flash ROM <A> 213, to detect whether an alteration exists. The first setting area 514 is an area where version information for the first BIOS 360, information about the verification range, and the like are set in the Flash ROM <A> 213, as in an example illustrated in FIG. 4. The alteration detection unit 351 verifies whether an alteration exists in a specific area such as the layout information on the Flash ROM <A> 213 by using a first specific area signature value 515 (described below) stored in the Flash ROM <A> 213. The alteration detection unit 351 verifies a second setting area 524 by using a second setting area signature value 523 (described below) stored in the Flash ROM <B> 214, to detect whether an alteration exits. The second setting area 524 is an area where version information for the second BIOS 520, information about the verification range, and the like are set in the Flash ROM <A> 214 (examples of these pieces of information are illustrated in FIG. 4). The alteration detection unit 351 verifies whether an alteration exists in a specific area on the Flash ROM <B> 214 by using a second specific area signature value 525 (described below) stored in the Flash ROM <B> 214.

When the alteration detection unit 351 detects an alteration in the first BIOS 360, a recovery unit 352 recovers the first BIOS 360 by using the second BIOS 520 stored in the Flash ROM <B> 214. Examples of methods for implementing the recovery include a method in which the first BIOS 360 in the Flash ROM <A> 213 is deleted and then the second BIOS 520 area read from the Flash ROM <B> 214 is written to a free area generated in the deletion. Since the second BIOS 520 is copy data of the first BIOS 360, the first BIOS 360 can be recovered to the normal state by overwriting the altered first BIOS 360 with the second BIOS 520 in this way. In this case, the recovery unit 352 also overwrites the first BIOS signature value 512 in the Flash ROM <A> 213 with the second BIOS signature value 522 in the Flash ROM <B> 214. The recovery unit 352 further overwrites the first setting area 514 and the first setting area signature value 513 in the Flash ROM <A> 213 with the second setting area 524 and the second setting area signature value 523 in the Flash ROM <B> 214, respectively. The recovery unit 352 further overwrites the first specific area signature value 515 in the Flash ROM <A> 213 with the second specific area signature value 525 in the Flash ROM <B> 214.

An information reading unit 353 reads information from the first setting area 514 stored in the Flash ROM <A> 213 or the second setting area 524 stored in the Flash ROM <B> 214 where information as illustrated in FIG. 4 is set. The information reading unit 353 starts operation after the alteration detection unit 351 verifies that no alteration exists in the first setting area 514 and the second setting area 524 (described below with reference to FIGS. 6A and 6B). Example formats of the first setting area 514 and the second setting area 524 are illustrated in FIG. 5. Each of the setting areas 514 and 524 includes, for example, the BIOS version information, the number of verification targets that indicates the number of BIOS verification ranges, and a plurality of verification range start addresses and a plurality of verification range sizes which correspond in number to verification targets. While FIG. 4 illustrates one pair of the verification range start address and the verification range size, this information includes a pair of the verification range start address and the verification range size so as to repeat verification for the number of verification targets. In a case where an electronic signature is generated by calculating a hash value for non-continuous areas excluding areas where setting values are updated in the BIOS, the number of verification ranges becomes more than one and the number of verification targets becomes greater than or equal to two.

When the alteration detection unit 351 verifies the specific area on the Flash ROM <A> 213 by using the first specific area signature value 515, the range on the Flash ROM <A> 213 where the specific area exists may be described at the end of the first setting area 514. When the alteration detection unit 351 verifies the specific area on the Flash ROM <B> 214 by using the second specific area signature value 525, the range on the Flash ROM <B> 214 where the specific area exists may be described at the end of the second setting area 524. The range where the specific area exists may be hard-coded in the built-in controller software 350. Examples of specific areas include the Flash Descriptor Region in the nonvolatile memory and any partial area to be subjected to the alteration detection, in particular.

A version comparison unit 354 compares the version information for the first BIOS 360 with the version information for the second BIOS 520. The version comparison unit 354 compares the version information for the first setting area 514 stored in the Flash ROM <A> 213 with the version information for the second setting area 524 stored in the Flash ROM <B> 214. As the version information, generally used version information is applicable. For example, the version information can be represented as an incremental value that indicates the software update and release history in time series. For example, in a case where the current version information for the BIOS is "1.0", the version information for the BIOS that has been updated and released after the implementation of bug corrections, function additions, vulnerability corrections, and the like can be an incremental value "1.1". In this case, since "1.1" is larger than "1.0" as a result of the version information comparison, the version comparison unit 354 determines that the BIOS having the version information "1.1" is the later BIOS. The version comparison unit 354 compares the version information for the first BIOS 360 with the version information for the second BIOS 520 to determine which of the first BIOS 360 and the second BIOS 520 is the later BIOS. The above-described version information is to be considered as illustrative, and may be a combination of a numerical value and an alphabet. For example, in a case where the current version is "1.0a" and a new version is "1.0b", the alphabetical order (based on a relation a<b<c< . . . <z) can be used to represent the update history in time series.

In a case where the version comparison unit 354 determines that the version of the first BIOS 360 is later than the version of the second BIOS 520, the first update unit 355 updates the second BIOS 520 with the first BIOS 360. Examples of methods for implementing the deletion include a method in which the second BIOS 520 in the Flash ROM <B> 214 is deleted and then the first BIOS 360 read from the Flash ROM <A> 213 is written to the free area generated in the deletion. The first update unit 355 overwrites the second BIOS signature value 522 in the Flash ROM <B> 214 with the first BIOS signature value 512 in the Flash ROM <A>

213 to update the signature value to the signature value corresponding to the updated second BIOS 520. Similarly, the first update unit 355 updates the second setting area 524, the second setting area signature value 523, and the second specific area signature value 525 with the first setting area 514, the first setting area signature value 513, and the first specific area signature value 515, respectively. According to the present exemplary embodiment, the first BIOS 360 incorporates the first built-in controller software 350, the first BIOS signature value 512, the first setting area signature value 513, the first setting area 514, and the first specific area signature value 515, as illustrated in FIG. 5. The second BIOS 520 incorporates the second built-in controller software 521, the second BIOS signature value 522, the second setting area signature value 523, the second setting area 524, and the second specific area signature value 525. Thus, at the same time when the second BIOS 520 is updated, other pieces of information are also collectively updated.

After completion of the above-described function processing, the built-in controller software 350 transmits the reset signal to the CPU 201 to transfer control to the CPU 201. Then, the built-in controller 212 enters the sleep mode.

Functions to be executed by the CPU 201 will be described below. The CPU 201 executes the BIOS 360 stored in the Flash ROM <A> 213. The CPU 201 loads a loader 370, an initrd 380, a kernel 390, and controller software 300 stored in the Flash ROM 211 into the RAM 202 and then executes these programs. The BIOS 360 performs basic processing for enabling the CPU 201 to control the I/O controller 203 and the RAM 202. The BIOS 360 further includes processing for loading the loader 370 from the Flash ROM 211 and then starting the loader 370. The loader 370 performs processing for loading the kernel 390 of the operating system (OS) and the initrd 380 from the Flash ROM 211 and then starting these programs. The initrd 380 performs processing for loading the controller software 300 from the Flash ROM 211 and then starting the program.

An operation control unit 301 displays a screen image for the user on the operation unit 102, detects a user operation, and performs processing associated with screen components such as buttons displayed on the screen. A data storage unit 302 stores data in and reads data from the Flash ROM 211 upon request from other control units. For example, in a case where the user wants to change a certain device setting, the operation control unit 301 detects what a user has input to the operation unit 102. In response to a request from the operation control unit 301, the data storage unit 302 stores information about the user input as setting values in the Flash ROM 211. A job control unit 303 controls job execution according to instructions from other control units. An image processing unit 304 processes the image data into a suitable format for each application according to instructions from the job control unit 303.

A print processing unit 305 prints an image on a paper medium and outputs the paper medium via the printer I/F 207 according to instructions from the job control unit 303. A read processing unit 306 reads a placed document via the scanner I/F 208 according to instructions from the job control unit 303. When the system is activated and when a setting change is detected, a network control unit 307 performs network setting including the Internet Protocol (IP) address setting on a Transmission Control Protocol/Internet Protocol (TCP/IP) control unit 308 according to the setting values stored in the data storage unit 302. The TCP/IP control unit 308 performs processing for transmitting and receiving network packets via the network I/F 204 according to instructions from other control units. A USB control unit 309 controls the USB I/F 209 to control any USB-connected devices.

The second update unit 310 updates the first BIOS 360 stored in the Flash ROM <A> 213. This update method is implemented, for example, by overwriting the first BIOS 360 in the Flash ROM <A> 213 with an update BIOS acquired via a network or a USB memory. Similarly, the second update unit 310 also updates the version information and the first BIOS signature value 512 in the Flash ROM <A> 213 with the version information and the signature value for the update BIOS accompanying the update BIOS, respectively. After completion of the BIOS update processing, the second update unit 310 requests the controller unit 101 to restart the system to enable the first update unit 355 to update the second BIOS 520.

FIG. 5 illustrates an example of data to be arranged in the Flash ROM <A> 213 serving as a first storage medium and the Flash ROM <B> 214 serving as a second storage medium. The Flash ROM <A> 213 that is accessible from the CPU 201 and the built-in controller 212 stores the first BIOS 360 which serves as a first boot code. The Flash ROM <A> 213 stores the first built-in controller software 350, the first BIOS signature value 512, the first setting area signature value 513, the first setting area 514, and the first specific area signature value 515. In the present exemplary embodiment, a description will be provided a configuration in which the verification range setting area of the first BIOS 360 is incorporated as the first setting area 514 in the first BIOS 360. However, this configuration is to be considered as merely illustrative.

Instead of incorporating the verification range setting area in the first BIOS 360, the first setting area 514 and the first setting area signature value 513 may be stored in the Flash ROM <A> 213 separately from the first BIOS 360. The first BIOS signature value 512 is the digital signature value for the first BIOS 360. As described above, the first BIOS signature value 512 is used by the alteration detection unit 351 to verify the first BIOS 360 to detect whether an alteration exists. The first BIOS signature value 512 is an example of a boot code signature value for the entire first boot code.

On the other hand, the Flash ROM <B> 214 that is accessible only from the built-in controller 212 stores the second BIOS 520 which serves as a second boot code. The Flash ROM <B> 214 stores the second built-in controller software 521, the second BIOS signature value 522, the second setting area signature value 523, the second setting area 524, and the second specific area signature value 525. According to the present exemplary embodiment, as in the above-described configuration, the verification range setting area of the second BIOS 520 is incorporated as the second setting area 524 in the second BIOS 520. Similarly, the second BIOS signature value 522 serves as the digital signature value for the second BIOS 520. The second BIOS signature value 522 is an example of a boot code signature value for the entire second boot code. Here, the second BIOS 520 is binary data to be used by the recovery unit 352 to recover the first BIOS 360 to the normal state, as described above. As long as the system is not activated immediately after alteration, data loss, or the update of the first BIOS 360, the second BIOS 520 is the binary data (copy data) same as the first BIOS 360 in the Flash ROM <A> 213. Similarly, the second built-in controller software 521 and the second BIOS signature value 522 are also the binary data (copy data) same as the first built-in controller software 350 and the first BIOS signature value 512, respectively, in the Flash ROM <A>

213. The second setting area signature value 523, the second setting area 524, and the second specific area signature value 525 are also the binary data (copy data) same as the first setting area signature value 513, the first setting area 514, and the first specific area signature value 515, respectively, in the Flash ROM <A> 213.

Processing Flow

Figure 6A:
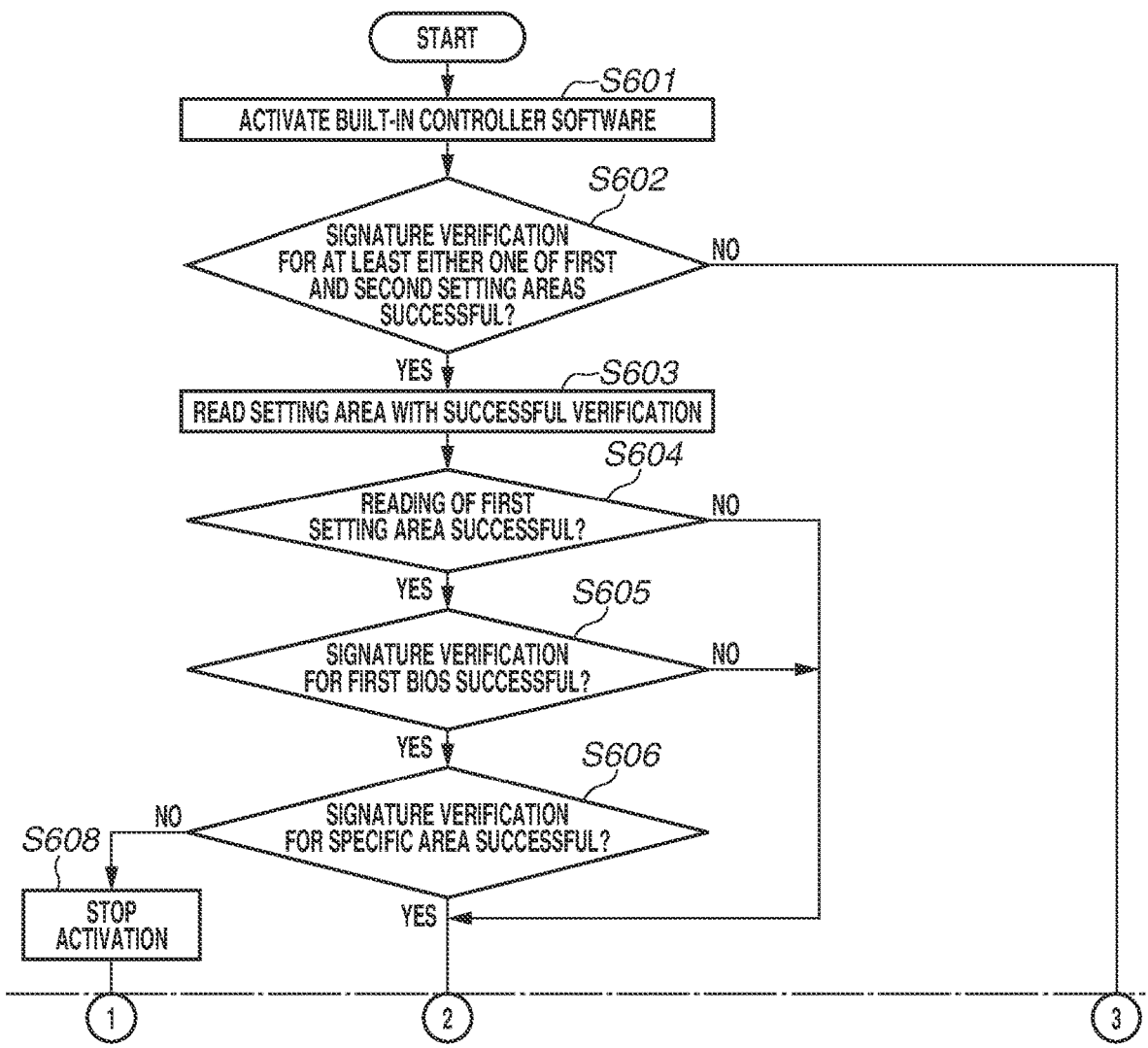
FIGS. 6A and 6B are a flowchart illustrating an example of processing during activation of the MFP.
Figure 6B:
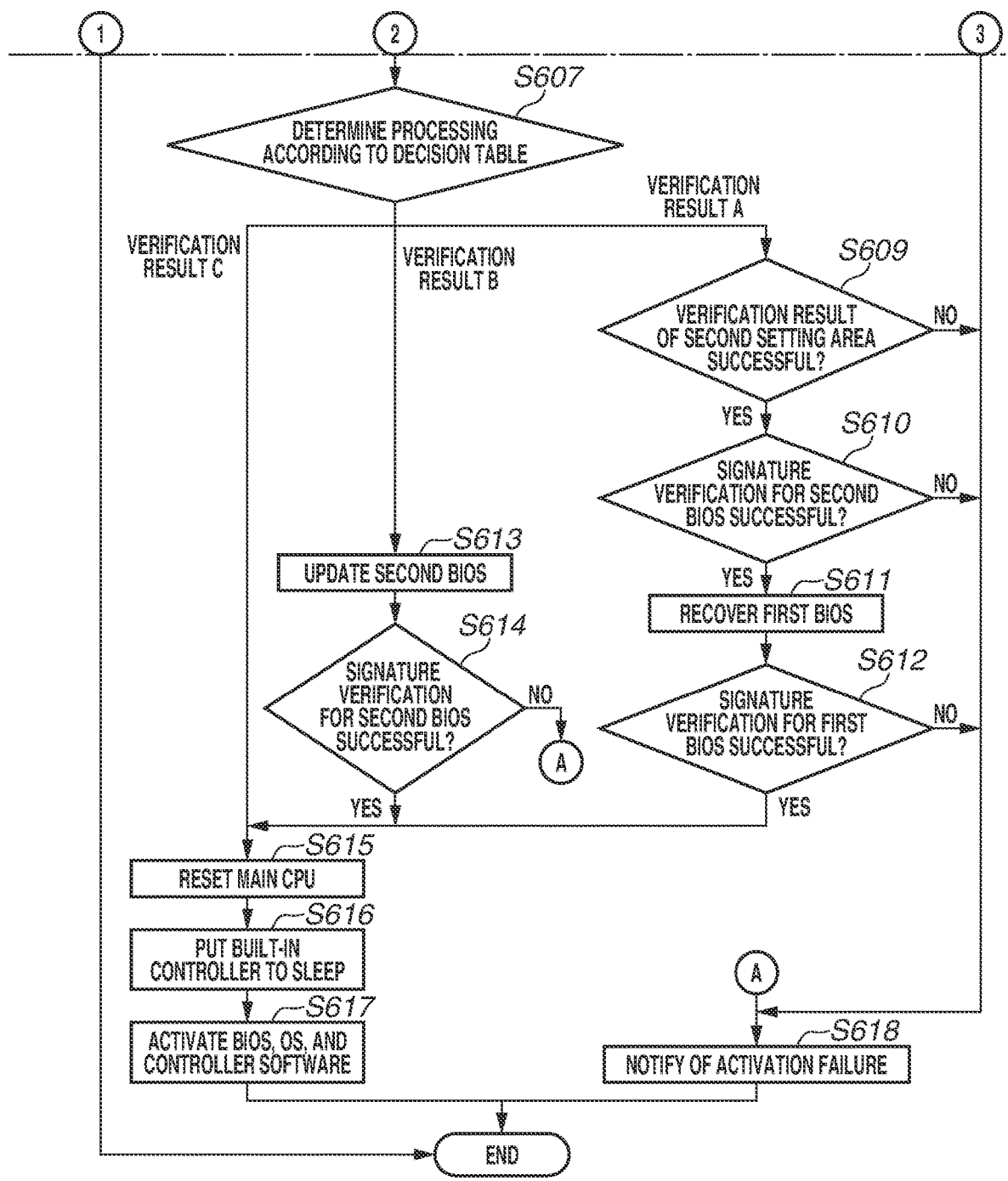

Processing for detecting a software alteration, processing for recovering the altered software, and processing for updating the recovery software according to the present exemplary embodiment will be described below with reference to FIGS. 6A and 6B. FIGS. 6A and 6B are a flowchart illustrating an example of processing during activation of the MFP 100 according to the present exemplary embodiment.

After power of the MFP 100 is turned ON, then in step S601, the built-in controller 212 activates the built-in controller software 350.

In step S602, the alteration detection unit 351 verifies whether an alteration exists in the first setting area 514 related to the first BIOS 360 and in the second setting area 524 related to the second BIOS 520 through the signature verification. The alteration detection unit 351 verifies the first setting area 514 by using the first setting area signature value 513, and verifies the second setting area 524 by using the second setting area signature value 523. The built-in controller 212 determines whether the signature verification is successful for at least either one of the first setting area 514 and the second setting area 524.

If the built-in controller 212 determines that the signature verification has failed in both the first setting area 514 and the second setting area 524 (NO in step S602), the processing proceeds to step S618. In step S618, the built-in controller 212 notifies the user of an activation failure of the MFP 100. Examples of activation failure notifications include log recording, an error notification via the operation unit 102, and an error occurrence notification to the user by the flickering of the light emitting diode (LED) or the power indicator on the MFP 100 and the built-in controller 212.

If the built-in controller 212 determines that the signature verification is successful for at least either one of the first setting area 514 and the second setting area 524 (YES in step S602), the processing proceeds to step S603. In step S603, the information reading unit 353 stores whether the verification is successful and then reads the first setting area 514 and/or the second setting area 524 for which the verification is successful.

In step S604, the built-in controller 212 determines whether the reading for the first setting area 514 is successful. If the built-in controller 212 determines that the verification and the information reading for the first setting area 514 are successful (YES in step S604), the processing proceeds to step S605. On the other hand, if the built-in controller 212 determines that the verification or the information reading for the first setting area 514 has failed (NO in step S604), the processing proceeds to step S607.

In step S605, the alteration detection unit 351 verifies whether an alteration exists in the first BIOS 360 by using the first BIOS signature value 512. In the verification, the alteration detection unit 351 calculates a hash value by using the number of verification targets, the verification range start address, and the verification range size set in the first setting area 514 read in step S603. More specifically, the alteration detection unit 351 reads data ranging from the verification range start address to the end address corresponding to the verification range size in the Flash ROM <A> 213, and then performs hash function Update processing. The alteration detection unit 351 repeats this sequence for the number of verification targets. Lastly, the alteration detection unit 351 performs hash function Finalize processing to calculate a hash value to be used for the verification processing related to the first BIOS 360. The built-in controller 212 determines whether the signature verification for the first BIOS 360 is successful. If the built-in controller 212 determines that the verification for the first BIOS 360 is successful (YES in step S605), the processing proceeds to step S606. If the built-in controller 212 determines that the verification for the first BIOS 360 has failed (NO in step S605), the processing proceeds to step S607.

In step S606, the alteration detection unit 351 verifies the specific area in the Flash ROM <A> 213 by using the first specific area signature value 515. The built-in controller 212 determines whether the signature verification for the specific area in the Flash ROM <A> 213 is successful. If the built-in controller 212 determines that the verification for the specific area in the Flash ROM <A> 213 is successful (YES in step S606), the processing proceeds to step S607.

On the other hand, if the built-in controller 212 determines that the verification for the specific area in the Flash ROM <A> 213 has failed (NO in step S606), the processing proceeds to step S608. In step S608, the built-in controller 212 stops the activation of the MFP 100. Stopping the activation enables the user to determine that the verification for the specific area has failed.

In step S607, the built-in controller 212 determines subsequent processing based on a result of the following processing:
  A result of the comparison between the version information for the first setting area 514 and the version information for the second setting area 524
  A result of the signature verification for the first setting area 514 and a result of the signature verification for the second setting area 524 performed in step S602
  A result of the signature verification for the first BIOS 360 performed in step S605
(1) In a case where the result of the signature verification for the first setting area 514 or the result of the signature verification for the first BIOS 360 indicates a failure (verification result A), the built-in controller 212 determines that the first BIOS 360 has been altered. The processing then proceeds to step S609.
(2) In a case where the result of the signature verification for the second setting area 524 indicates a failure or in a case where the result of the signature verification indicates a success and where the version information is different (verification result B), the processing proceeds to step S613.
(3) In a case where the result of the signature verification for the first setting area 514, the result of the signature verification for the second setting area 524, and the result of the signature verification for the first BIOS 360 all indicate a success and where the version information is the same (verification result C), the processing proceeds to step S615.

In step S609, to which the processing proceeds in a case of verification result A, the built-in controller 212 determines whether the signature verification for the second setting area 524 performed in step S602 is successful. If the built-in controller 212 determines that the signature verification for the second setting area 524 has failed (NO in step S609), the processing proceeds to step S618. In step S618, the built-in controller 212 notifies the user of an activation failure of the MFP 100. On the other hand, if the built-in controller 212 determines that the signature verification for the second setting area 524 is successful (YES in step S609), the processing proceeds to step S610.

In step S610, the alteration detection unit 351 verifies whether an alteration exists in the second BIOS 520 by using the second BIOS signature value 522 to ensure the authenticity of the second BIOS 520. In the verification, the alteration detection unit 351 calculates a hash value by using the number of verification targets, the verification range start address, and the verification range size set in the second setting area 524 read in step S603, and then performs the signature verification for the second BIOS 520. The built-in controller 212 determines whether the signature verification for the second BIOS 520 is successful. If the built-in controller 212 determines that the signature verification for the second BIOS 520 has failed (NO in step S610), the processing proceeds to step S618. In step S618, the built-in controller 212 notifies the user of an activation failure of the MFP 100. On the other hand, if the built-in controller 212 determines that the signature verification for the second BIOS 520 is successful (YES in S610), the processing proceeds to step S611.

In step S611, the recovery unit 352 recovers the first BIOS 360 in the Flash ROM <A> 213 by using the second BIOS 520 in the Flash ROM <B> 214. For example, the recovery unit 352 deletes the first BIOS 360 in the Flash ROM <A> 213 and then writes the second BIOS 520 (including the incorporated information) read from the Flash ROM <B> 214 to overwrites the first BIOS 360 with the second BIOS 520. In this way, the built-in controller 212 ensures the authenticity of the copy source before recovering the first BIOS 360.

After the recovery of the first BIOS 360, then in step S612, the alteration detection unit 351 performs the signature verification for the recovered first BIOS 360 to check whether the recovery has been normally completed. At this time, the alteration detection unit 351 verifies and reads the first setting area 514 again, calculates a hash value by using the number of read verification targets, the verification range start address, and the verification range size, and then performs the signature verification for the first BIOS 360. The built-in controller 212 determines whether the signature verification for the first BIOS 360 is successful. In a case where the built-in controller 212 determines that the signature verification for the first BIOS 360 has failed (NO in step S612), the processing proceeds to step S618. In step S618, the built-in controller 212 notifies the user of an activation failure of the MFP 100. On the other hand, if the built-in controller 212 determines that the signature verification for the first BIOS 360 is successful (YES in step S612), the processing proceeds to step S615.

In step S613, to which the processing proceeds in a case of verification result B, the first update unit 355 updates the second BIOS 520 in the Flash ROM <B> 214 with the first BIOS 360 in the Flash ROM <A> 213.

After updating the second BIOS 520, then in step S614, the alteration detection unit 351 performs the signature verification for the updated second BIOS 520 to check whether the update has been normally completed. In this case, the alteration detection unit 351 verifies and reads the second setting area 524 again, calculates a hash value by using the number of verification targets, the verification range start address, and the verification range size which have been read, and then performs the signature verification for the second BIOS 520. The built-in controller 212 determines whether the signature verification for the second BIOS 520 is successful. In a case where the built-in controller 212 determines that the signature verification for the second BIOS 520 has failed (NO in step S614), the processing proceeds to step S618. In step S618, the built-in controller 212 notifies the user of an activation failure of the MFP 100. On the other hand, in a case where the built-in controller 212 determines that the signature verification for the second BIOS 520 is successful (YES in step S614), the processing proceeds to step S615.

In step S615, the built-in controller 212 transmits the reset signal to the CPU 201 to transfer control to the CPU 201. Subsequently, in step S616, the built-in controller 212 enters the sleep mode. Upon reception of the reset signal, the processing proceeds to step S617. In step S617, the CPU 201 is activated. The CPU 201 then reads the first BIOS 360 in the Flash ROM <A> 213 to activate the system. The CPU 201 then loads the loader 370, the initrd 380, and the kernel 390 stored in the Flash ROM 211 into the RAM 202 and then executes these programs to activate the OS. Subsequently, the CPU 201 reads the controller software 300 stored in the Flash ROM 211 into the RAM 202 and then executes the controller software 300.

FIG. 7 illustrates the subsequent processing according to the result of the comparison between the version information for the first setting area 514 and the version information for the second setting area 524, the result of the signature verification for the first setting area 514, the result of the signature verification for the second setting area 524, and the result of the signature verification for the first BIOS 360 in the processing illustrated in FIGS. 6A and 6B.

As described above, the present exemplary embodiment makes it possible to provide the signature value for the specific area verification in addition to the signature value for the entire BIOS, and, when an alteration is detected in the specific area, identify the altered area by stopping the activation. The recovery and update of the BIOS can be suitably performed according to the results of the signature verification for the first setting area 514, the second setting area 524, and the first BIOS 360, and the result of the comparison of the version information.

First Modification

According to the above-described exemplary embodiment, the built-in controller 212 verifies the specific area in step S606. In a case where the verification has failed (NO in step S606), the processing proceeds to step S608. In step S608, the built-in controller 212 stops the activation of the MFP 100. In a case where the activation of the MFP 100 is stopped in step S608, the built-in controller 212 may notify the user that the activation of the MFP 100 is stopped, as in the processing in step S618. Examples of activation stop notifications include log recording, an error notification via the operation unit 102, and an activation stop notification to the user with the flickering of the light emitting diode (LED) or the power indicator on the MFP 100 and the built-in controller 212. In a case where the activation stop is notified of the user with the flickering of the LED or the power indicator, the built-in controller 212 may notify the user that the verification for the specific area has failed, by using a flickering pattern different from the one in step S618. In a case where a plurality of specific areas is provided, the built-in controller 212 can detect an alteration in the plurality of specific areas and notify the user of the alteration by providing a plurality of corresponding specific area signature values and changing the log output method and the method for flickering the LED or the power indicator depending on the detected specific area.

Second Modification

Figure 8A:
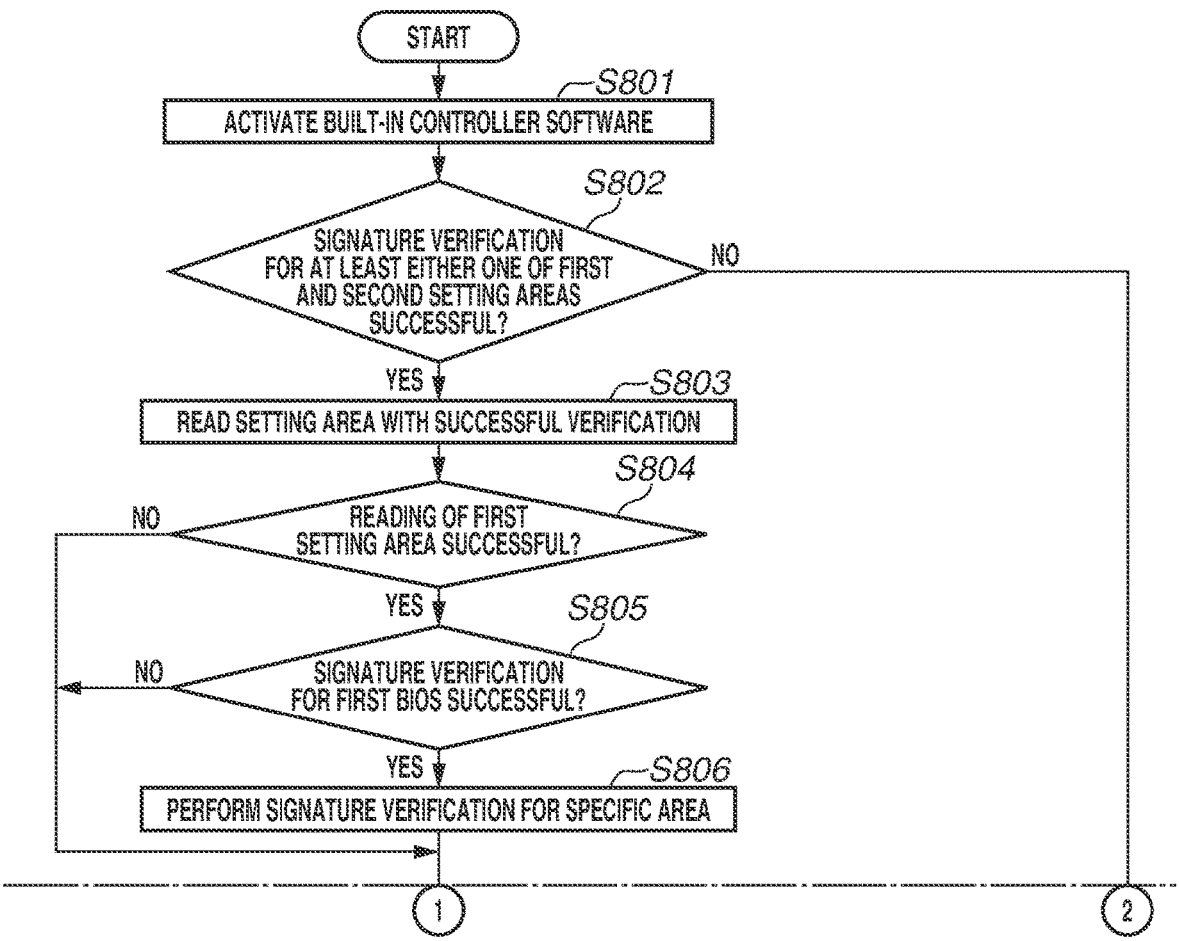
FIGS. 8A and 8B are a flowchart illustrating an example of other processing during activation of the MFP.
Figure 8B:
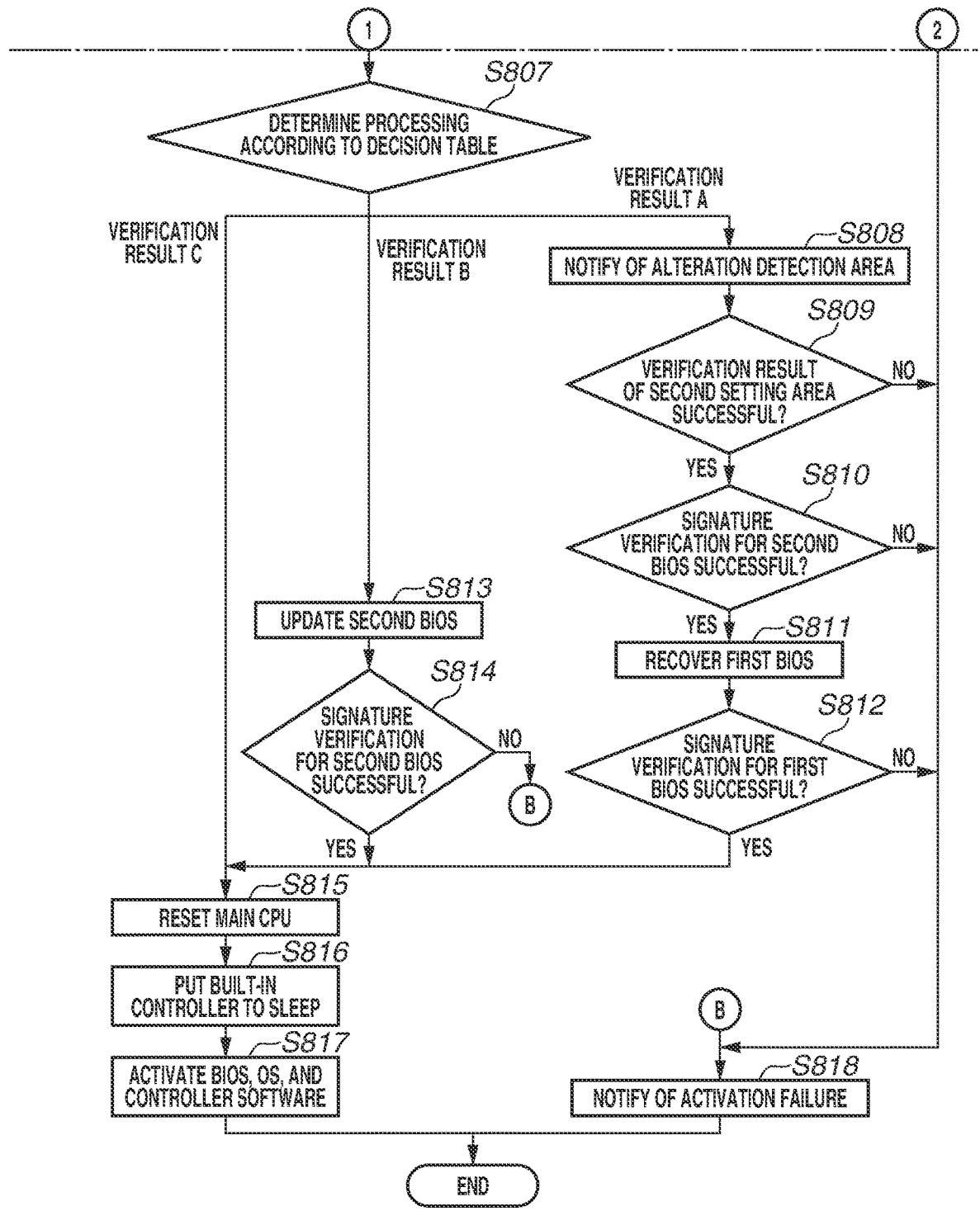

According to the above-described exemplary embodiment, the verification target using the BIOS signature value includes no specific area. A case where the verification target using the BIOS signature value includes a specific area will be described below with reference to FIGS. 8A and 8B. Referring to FIGS. 8A and 8B, the operations in steps S801 to S805 are similar to those in steps S601 to S605 in FIGS. 6A and 6B, respectively, and redundant descriptions thereof will be omitted. In step S806, the alteration detection unit 351 verifies the specific area in the Flash ROM <A> 213. If the signature verification for the first BIOS 360 performed in step S805 has failed and the specific area is altered (VERIFICATION RESULT A in step S807), then in step S808, the built-in controller 212 attempts to recover the first BIOS 360. In step S808, the built-in controller 212 notifies the user of the result of the signature verification for the first BIOS 360 performed in step S805 and the result of the signature verification for the specific area performed in step S806. In steps S809 to S812, the built-in controller 212 performs operations as in steps S609 to S612 in FIGS. 6A and 6B. In step S811, the recovery unit 352 recovers the first BIOS 360 by using the second BIOS 520. Performing processing in this way enables identification of the area in which alteration has been made and enables the user to recognize the tendency of tempers even in a case where the first BIOS 360 is recovered.

Third Modification

As in the above-described exemplary embodiment, in a case where the verification target using the BIOS signature value includes no specific area, processing can be performed according to the flowchart illustrated in FIGS. 8A and 8B. More specifically, In a case where the result of the signature verification for the first BIOS 360 indicates a success and the result of the signature verification for the specific area indicates a failure (VERIFICATION RESULT A in step S807), then in step S809, the built-in controller 212 may perform the recovery. The present modification enables any portion on the storage medium to be set to a recovery target.

Other Exemplary Embodiments

According to the above-described exemplary embodiment, the alteration detection is performed by using the signature value generated from a hash value generated by executing a hash function for a discontinuous verification range. Other examples of methods for performing the alteration detection include a method for generating a hash value and a signature value for each division verification range and using these values for the verification.

While the BIOS has been described as an example in the above-described exemplary embodiments and modifications, embodiments of the present disclosure are also applicable to firmware and software (programs) other than the BIOS. For example, in a case where the MFP 100 includes a NIC, bus connection is made to enable the built-in controller 212 to access the firmware of the NIC. In this case, the recovery and the copy data update for the NIC firmware is implemented by storing the copy data of the NIC firmware in the Flash ROM <B> 214 that is accessible only from the built-in controller 212.

While a description has been provided of an example where the built-in controller 212 directly activates the built-in controller software 350 in the above-described exemplary embodiments and modifications, the software may be activated in a multistage configuration. The multistage configuration can be implemented, for example, by storing the activation software that performs the alteration detection (signature verification) and activation of the built-in controller software 350 in the ROM of the built-in controller 212. Thus, the activation software stored in the ROM of the built-in controller 212 is activated to verify whether an alteration exists in the built-in controller software 350 stored in the Flash ROM <B> 214. Control can be performed so that the built-in controller software 350 is activated only when there is no alteration. In this case, the digital signature value of the built-in controller software 350 will be separately stored in the Flash ROM <B> 214.

Embodiments of the present disclosure are implemented by performing the following processing. More specifically, software (one or more programs) for implementing the functions of the above-described exemplary embodiments is supplied to a system or apparatus via a network or various types of storage media, and a computer (or a CPU or a micro processing unit (MPU)) of the system or apparatus reads and executes the program.

The above-described exemplary embodiments are to be considered as illustrative in the present disclosure, and are not to be interpreted as restrictive of the technical scope of the present disclosure. Embodiments of the present disclosure may be embodied in diverse forms without departing from the technical concepts or essential characteristics thereof.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)'), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-035241, filed Mar. 5, 2021, which is hereby incorporated by reference herein in its entirety.

What is claimed is:

1. An information processing apparatus comprising:
   a first non-transitory storage medium configured to store a first boot code, a boot code signature value, a specific area which has layout information indicating an arrangement of the first boot code, and a specific area signature value, wherein the boot code signature value is a signature for the first boot code and the specific area, and the specific area signature value is a signature for the specific area except for the first boot code; and
   first at least one processor implemented in hardware configured to execute first executable instructions, the first at least one processor being operable when executing the first executable instructions to perform detection of an alteration of the first boot code by using the boot code signature value stored in the first storage medium, and perform detection of an alteration in the specific area by using the specific area signature value stored in the first storage medium.

2. The information processing apparatus according to claim 1, wherein, in response to an alteration being detected in the specific area in the first storage medium by the first at least one processor, an activation of the information processing apparatus is stopped.

3. The information processing apparatus according to claim 2, wherein, in response to an alteration being detected in the specific area in the first storage medium by the first at least one processor, a notification that the activation of the information processing apparatus is stopped is issued.

4. The information processing apparatus according to claim 1, further comprising:
   a second storage medium configured to store a second boot code which is copy data of the first boot code,
   wherein the first at least one processor is operable when executing the first executable instructions to recover, in response to an alteration being detected in the first boot code by the first at least one processor, the first boot code by using the second boot code stored in the second storage medium.

5. The information processing apparatus according to claim 4,
   wherein the second storage medium stores the boot code signature value for an entire second boot code,
   wherein the first at least one processor performs detection of any alteration in the second boot code by using the boot code signature value stored in the second storage medium, and
   wherein, in response to no alteration being detected in the second boot code by the first at least one processor, the first at least one processor recovers the first boot code.

6. The information processing apparatus according to claim 4, further comprising:
   second at least one processor configured to execute second executable instructions, the second at least one processor being operable when executing the second executable instructions to read the first boot code and activate the information processing apparatus, after the first at least one processor performs detection of an alteration in the first boot code and the first at least one processor recovers the first boot code by using the second boot code,
   wherein the first storage medium is connected to the first at least one processor and the second at least one processor, and
   wherein the second storage medium is connected only to the first at least one processor.

7. The information processing apparatus according to claim 4, wherein, in response to an alteration being detected in the specific area in the first storage medium by the first at least one processor, in a case where the specific area in the first storage medium is included in an area of the first boot code, the first at least one processor records or notifies that an alteration is detected in the specific area before the first boot code is recovered.

8. The information processing apparatus according to claim 4, wherein, in response to an alteration being detected in the specific area in the first storage medium by the first at least one processor, the first at least one processor recovers the first boot code.

9. The information processing apparatus according to claim 1, wherein, in a case where version information related to the first boot code and information indicating a verification range are read from a setting area in the first storage medium, and no alteration is detected in the setting area in the first storage medium, the first at least one processor performs detection of an alteration of the first boot code in accordance with the read information indicating the verification range.

10. The information processing apparatus according to claim 1, wherein the information processing apparatus is an image forming apparatus.

11. An information processing method that is performed by an information processing apparatus, the information processing method comprising:
    storing, as first storing, in a first non-transitory storage medium included in the information processing apparatus, a first boot code, a boot code signature value, a specific area which has layout information indicating an arrangement of the first boot code, and a specific area signature value, wherein the boot code signature value is a signature for the first boot code and the specific area, and the specific area signature value is a signature for the specific area except for the first boot code;
    performing detection of, as first alteration detecting, an alteration of the first boot code by using the boot code signature value stored in the first storage medium; and
    performing detection of, as second alteration detecting, an alteration in the specific area by using the specific area signature value stored in the first storage medium.

12. A non-transitory computer-readable storage medium storing executable instructions, which when executed by one or more processors of an information processing apparatus, cause the information processing apparatus to perform a method comprising:
    storing, as first storing, in a first non-transitory storage medium included in the information processing apparatus, a first boot code, a boot code signature value, a specific area which has layout information indicating an arrangement of the first boot code, and a specific area signature value, wherein the boot code signature value is a signature for the first boot code and the specific area, and the specific area signature value is a signature for the specific area except for the first boot code;
    performing detection of, as first alteration detecting, an alteration of the first boot code by using the boot code signature value stored in the first storage medium; and performing detection of, as second alteration detecting, an alteration in the specific area by using the specific area signature value stored in the first storage medium.

\* \* \* \* \*